March 6, 1973  G. R. HOWLAND  3,719,039
FLUID ANALOG CONTROL APPARATUS
Original Filed Nov. 18, 1968  5 Sheets-Sheet 1

United States Patent Office 3,719,039
Patented Mar. 6, 1973

3,719,039
FLUID ANALOG CONTROL APPARATUS
George R. Howland, South Bend, Ind., assignor to
The Bendix Corporation
Original application Nov. 18, 1968, Ser. No. 776,832, now Patent No. 3,587,606. Divided and this application Jan. 22, 1971, Ser. No. 109,001
Int. Cl. F02c 9/04
U.S. Cl. 60—39.28 R      6 Claims

ABSTRACT OF THE DISCLOSURE

A bridge circuit having at least two parallel flow paths each of which paths are provided with a pair of series flow restrictions having a common flow area ratio. A floating or integrating piston connected to vary the effective flow area of one of the restrictions is responsive to the fluid pressure intermediate each pair of series restrictions which pressures are varied in accordance with variations in effective flow area of one or more of said restrictions in response to an associated input signal or signals applied thereto. Motion of the piston in response to a pressure differential between the intermediate pressures results in a corresponding change in flow area of the one restriction connected thereto to establish equalization of the intermediate pressures. A plurality of variable area parallel flow restrictions each of which is controlled by an associated input signal may be substituted for one of the restrictions. The position of the piston provides an output position which is a function of the sum, product or ratio of the various inputs controlling the restrictions. In addition, the piston may be connected to control the effective flow area of a restriction in a second bridge circuit similar to that described to extend the central functions of the fluidic system as desired. Pure fluid amplifying devices are suitably connected in the fluid circuitry to provide signal amplification thereby improving response of the piston.

---

This application is a division of application Ser. No. 776,832 filed Nov. 18, 1968, now Pat. No. 3,587,606.

It is a common practice in the combustion engine field and particularly gas turbine engines to control fuel flow to the engine as linear or non-linear functions of one or more variable control input signals by means of the well-known hydromechanical fuel control. Depending upon the number of control input signals impressed upon the fuel control and the necessity for comparing, integrating and/or transducing the plurality of input signals to convert the same to a useable output signal for fuel control purposes, the fuel control becomes a complex mass of levers, cams, pistons, pivots, anti-friction bearings, and servo valves providing signal amplification which, in turn, is not desirable from the standpoint of manufacturing cost, weight, and size as well as reliability, accuracy of operation and maintenance. Furthermore, the various control circuits normally cannot be separately enclosed in spaced apart casings for engine mounting purposes due to the requirement for interconnecting levers, cams and the like which are required to transmit control signals therebetween.

It is an object of the present invention to provide fluidic control apparatus which functions in response to one or more control input signals to provide one or more control output signals as linear or non-linear functions of the control input signals with a minimum number of mechanical control elements.

It is another object of the present invention to provide a reliable and accurate combustion engine fuel control which is fluidic in operation and relatively lightweight, inexpensive to manufacture and easily separated into a plurality of component units connected by fluid transmitting lines to compensate for limited mounting space on an engine.

Other objects and advantages of the present invention will be apparent from the following description taken with the accompanying drawings wherein.

Figure 1:
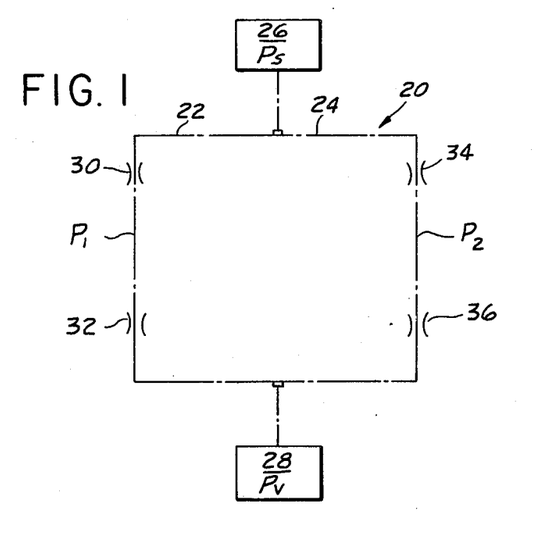
FIG. 1 is a schematic representation of a fluidic bridge circuit.

Referring to FIG. 1, numeral 20 represents a fluidic bridge circuit having parallel flow paths 22 and 24 connected to a source of pressurized fluid 26 at pressure $P_s$ and a relatively lower pressure source of fluid 28 at pressure $P_v$. A pair of fluid flow restrictions 30 and 32 are connected in series in flow path 22 and a pair of fluid flow restrictions 34 and 36 are connected in series in flow path 24. It will be recognized from the well-known fluid flow equations for series flow restrictions that the fluid pressure $P_1$ intermediate restrictions 30 and 32 and the fluid pressure $P_2$ intermediate the restrictions 34 and 36 are equal when the ratio of flow areas of restrictions 30 and 32 is equal to the ratio of flow areas of restrictions 34 and 36. Area variations in one or more of the restrictions 30, 32, 34 and 36 such that the ratio of areas of the two pairs of restrictions 30, 32, and 34, 36 is unequal, results in a pressure differential between $P_1$ and $P_2$ depending upon the magnitude of ratio error.

Figure 2:
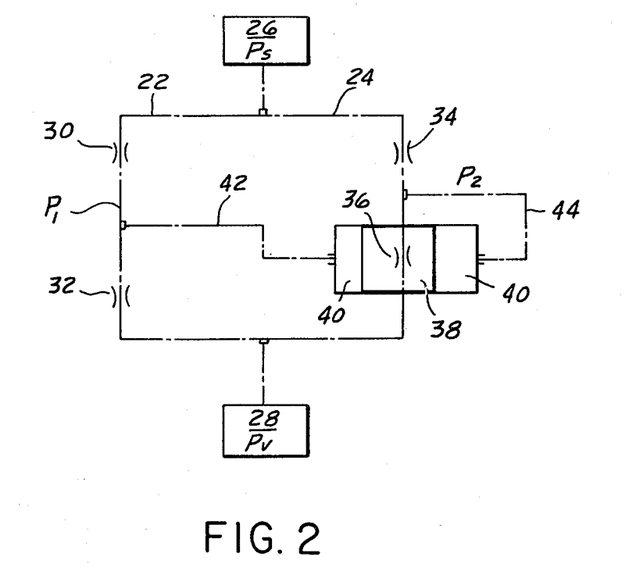
FIG. 2 is a schematic representation of a fluidic bridge circuit operating on the principle of FIG. 1 and forming the basis for the fluidic control network of the present invention.

Referring to FIG. 2, the bridge circuit of FIG. 1 is provided with a floating or integrating piston 38 suitably connected to vary the area of restriction 36 depending upon the position of piston 38. The piston 38 is slidably carried in a chamber 40 vented at opposite end portions to pressure $P_1$ and $P_2$ via passages 42 and 44, respectively. The opposite ends of piston 38 are provided with equal end areas exposed to pressures $P_1$ and $P_2$, respectively. It will be recognized that a pressure differential $P_1-P_2$ will generate a force unbalance tending to move piston 38 in one direction or the other depending upon the relative error between pressures $P_1$ and $P_2$ until the pressure differential therebetween is reduced to zero. Thus, if the area $A_{30}$ or $A_{32}$ of restriction 30 or 32, respectively, is varied causing an increase in pressure $P_1$, the resulting pressure differential $P_1-P_2$ will upset piston to the right as viewed in FIG. 2 until the area of restriction 36 is reduced to the point where the ratio of areas $A_{34}$ and $A_{36}$ corresponding to restrictions 34 and 36, respectively, is equal to the ratio $A_{30}/A_{32}$. Likewise, if the area $A_{30}$ or $A_{32}$ is varied causing a decrease in pressure $P_1$, the resulting pressure differential $P_2-P_1$ will upset piston to the left until the area $A_{36}$ is increased to the point where $A_{34}/A_{36}$ equals $A_{30}/A_{32}$. Similarly, a variation in area $A_{34}$ causes pressure $P_2$ to vary resulting in a pressure difference between $P_1$ and $P_2$ depending upon the relative change in area $A_{34}$ which, in turn, upsets piston 38 to the right or left causing a corresponding change in area $A_{38}$ to reestablish the relationship $A_{30}/A_{32} = A_{34}/A_{36}$ and thus equalize pressures $P_1$ and $P_2$.

Figure 3:
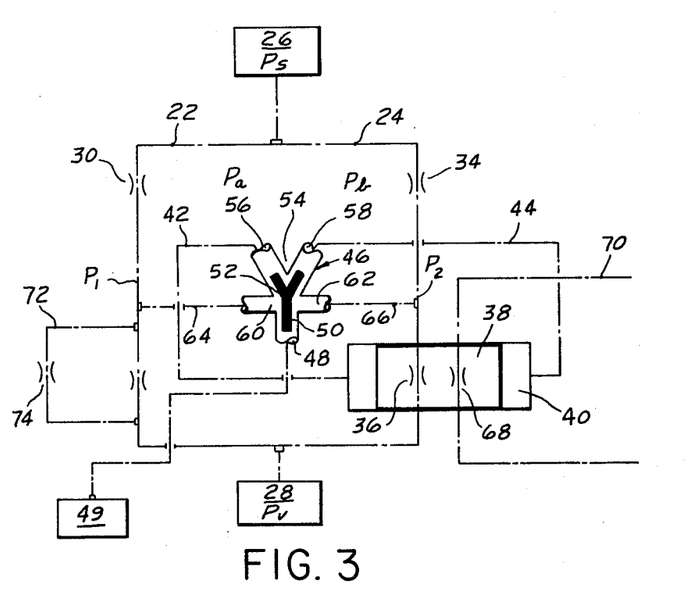
FIG. 3 is a schematic representation of a modified form of the bridge circuit of FIG. 2.

Referring to FIG. 3, the bridge circuit of FIG. 2 is provided with a conventional pure fluid amplifier 46 of the proportionally acting type which is provided with an inlet port 48 connected to a suitable source of pressurized fluid 49 and adapted to generate a power fluid jet stream 50 which passes through a jet interaction chamber 52 to a wedge shaped flow splitter 54 which diverts equal portions of the jet stream 50 to each of two diverging output passages 56 and 58 thereby producing equal output fluid pressures $P_a$ and $P_b$ at passages 56 and 58, respectively. Opposed and aligned control fluid ports 60 and 62 are connected to receive fluid at pressure $P_1$ and $P_2$, respectively, via passages 64 and 66. The control fluid ports 60 and 62 at pressures $P_1$ and $P_2$, respectively, affect the power jet stream 50 causing deflection of the jet stream 50 in proportion to the pressure differential $P_1 - P_2$ between the two control ports. The deflection of the power jet stream 50 results in one or the other of the output passages 56 and 58 receiving the greater portion of the power jet stream 50 depending upon the direction of deflection thereof which, in turn, results in an output fluid pressure differential proportional to the control fluid pressure differential $P_1 - P_2$ imposed across jet stream 50. It will be recognized that a very high gain characteristic is exhibited by amplifier 46 since the power jet stream 50 is readily responsive to a relatively small control fluid pressure differential $P_1 - P_2$ imposed thereon such that the resulting diverting of the significantly larger fluid mass of the power jet stream 50 produces a correspondingly larger output fluid pressure differential $P_a - P_b$. The output fluid pressures $P_a$ and $P_b$ are vented to passages 42 and 44, respectively, leading to opopsite ends of piston 38 which may be connected to control the effective flow area of a restriction 68 in a second bridge circuit 70 similar to bridge circuit 20.

The flow path 22 may be provided with a branch circuit defined by a passage 72 containing a restriction 74 and connected in parallel flow relationship with restriction 32. The intermediate pressure $P_1$ now depends upon the areas $A_{30}$ and $A_{32}$ as well as the area $A_{74}$, of restriction 74 according to the ratio relationship $A_{30}/A_{32} + A_{74}$.

From the above described bridge circuitry, it will be seen that the output position X, of piston 38 provides an output signal defined by the following relationships:

(1)
$$X = K \frac{A_{32}}{A_{30}} A_{34}$$

and (2)
$$X = K \frac{(A_{32} + A_{70})}{A_{30}} A_{34}$$

wherein K is a constant including the various flow coefficients, etc., normally required in fluid circuit computations as will be recognized by those persons skilled in the art. Equations 1 and 2 indicate that the position of piston 38 may provide an output signal proportional to the sum, product or ratio of two inputs by varying the area of appropriate restrictions 30, 32, 34 and/or 74 in response to the desired inputs.

Figure 4:
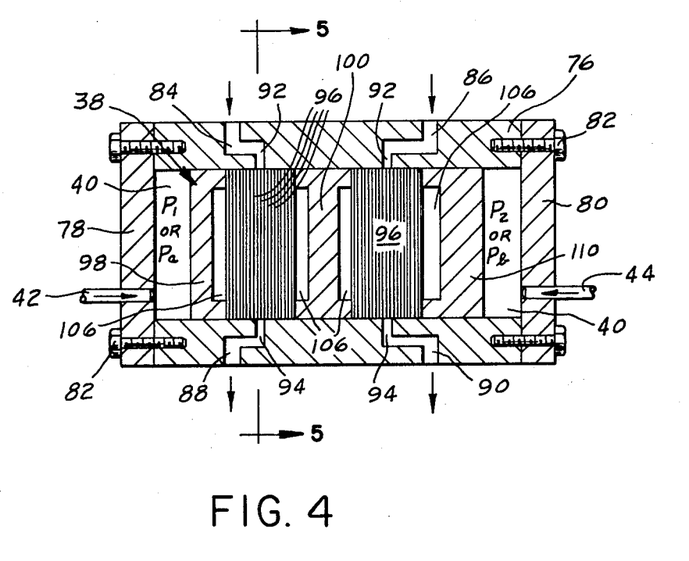
FIG. 4 is a schematic representation of an integrating piston portion of FIG. 3 which defines one or more variable effective flow area restrictions.
Figure 5:
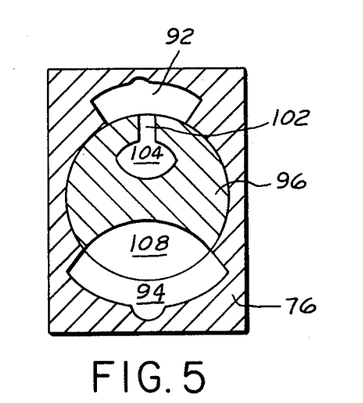
FIG. 5 is a sectional schematic view taken on line 5—5 of FIG. 4.

Referring to FIGS. 4 and 5, the floating piston 38 is shown removed from the bridge circuit of FIG. 3 and enlarged to more clearly show the details thereof. The piston 38 is slidably carried in chamber 40 defined by a casing 76 suitably bored and provided with end caps 78 and 80 secured to casing 76 by a plurality of suitable fastening means such as spaced apart bolts 82 to provide a seal against leakage outwardly from chamber 40.

Casing 76 is provided with a pair of inlet ports 84 and 86 and corresponding outlet ports 88 and 90. Each inlet port 84 and 86 communicates with an associated circumferentially extending arcuate slot 92 formed in the wall of chamber 40. Each of the outlet ports 88 and 90 communicate with an associated circumferentially extending slot 94 formed in the wall of chamber 40 diametrically opposite the associated arcuate slot 92. A plurality of relatively thin circular discs 96 stacked between an end portion 98 and center portion 100 of piston 38 are each provided with a radially extending slot 102 which varies in circumferential length depending upon the particular disc 96 selected and which is adapted to communicate with circumferentially extending slot 92 as will be described. The slot 102 communicates with an opening 104 which, with the discs 96 stacked with slots 102 and openings 104 in alignment, provides an axial flow path to a circular recess 106 formed in each of the end and center portions 98 and 100, respectively.

Each disc 96 is further provided with an opening 108 diametrically opposite slot 102 which, with discs 96 stacked, are mutually aligned to provide an axial flow path communicating recess 106 with slot 94 leading to outlet port 88.

A second plurality of discs 96 may be stacked between center portion 100 and an end portion 110 of piston 38 to provide a variable area flow restriction between inlet and outlet ports 86 and 90 similar to that heretofore described between inlet and outlet ports 84 and 88.

With each of the stacks of aligned discs 96 interposed between the respective end portions 98 and 110 and center portion 100, the resulting assembly may be unitized by any of various conventional bonding treatments to permanently unitize the assembly as will be recognized by those skilled in the art.

The circular discs 96 provide an independently variable area flow restriction between the respective inlet and outlet ports 84, 88 and 86, 90, respectively. To that end, when any given disc 96 of either stack is located in the plane of its associated arcuate slot 92 depending upon the position of piston 38, the effective flow area is determined by the arcuate length of the particular slot 102 registering with the associated slot 92. The relationship between piston 38 position and flow area defined by either or both of the stacks of discs 96 may be established as desired by suitable arrangement of the discs 96. For instance, a disc 96 with a minimum size slot 102 may be placed adjacent a disc 96 with a maximum size slot to provide a maximum flow area change for a one disc 96 width motion of piston 38. In this manner, relatively large changes in flow area for small changes in position of piston 38 are obtained. It will be recognized that the motion and thus position of piston 38 depends upon the differential error between the fluid pressures $P_1$ and $P_2$, or in the case of using pure fluid amplifier 46 pressures $P_a$ and $P_b$, exerted against end portions 98 and 110, respectively.

Figure 6:
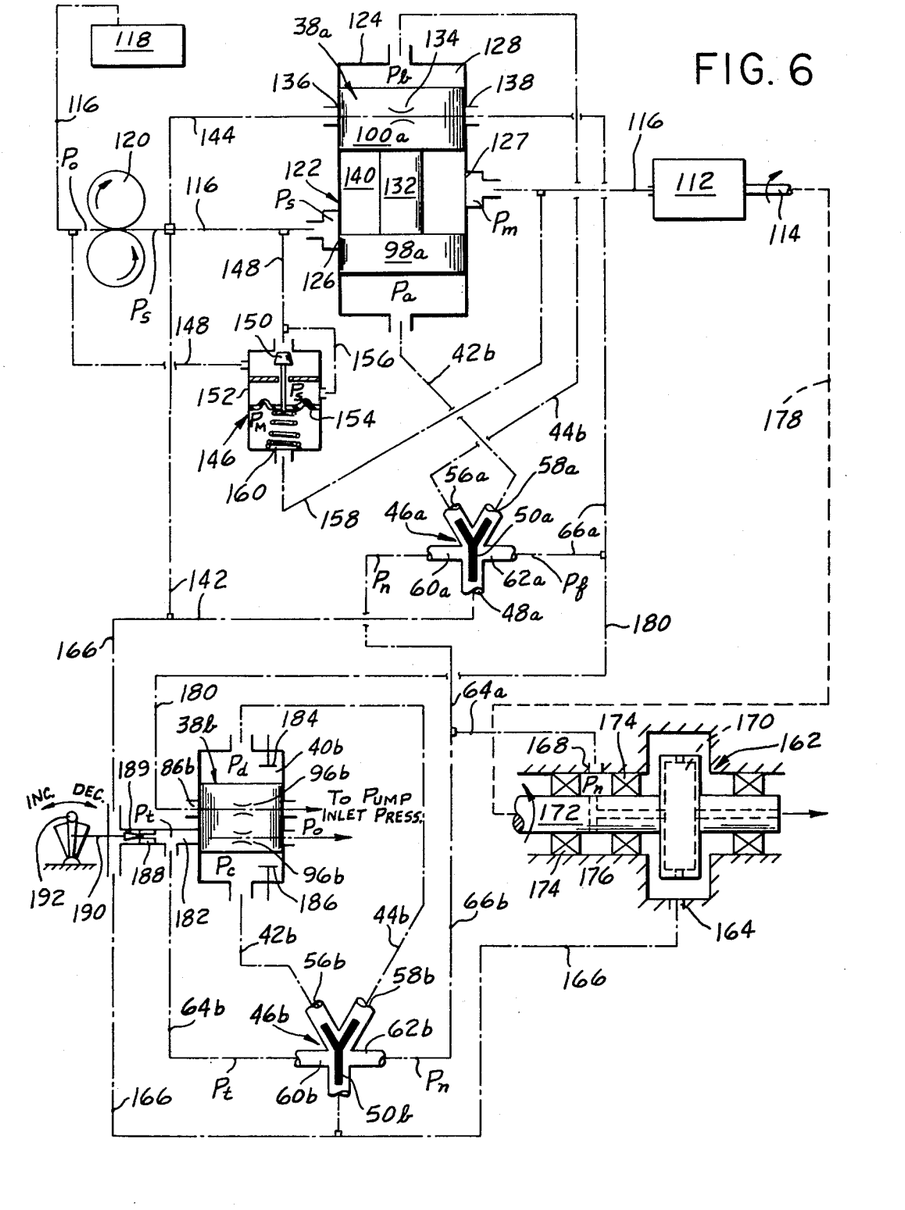
FIG. 6 is a schematic representation of a gas turbine engine fuel control system embodying the present invention.

Referring to FIG. 6 and the gas turbine engine fuel control represented thereby, numeral 112 designates, in block form, a conventional gas turbine engine having a compressor, not shown. The rotational speed of the compressor is represented by the rotary motion of an output shaft 114 connected to the compressor. The engine 112 receives a metered flow of fuel via a supply conduit 116 leading from a fuel source 118 and including an engine driven fuel pump 120 and a variable area fuel metering device generally indicated by 122. In the following discussion of FIG. 6, elements similar to that heretofore discussed are identified by like numerals having the subletter a, b, etc., added thereto.

The fuel metering device 122 includes a casing 124 having a fuel inlet 126 and a fuel outlet 127 in series with conduit 116. A chamber 128 in casing 124 slidably carries a piston 38a substantially equivalent to piston 38 of FIG. 4 but with one stack of discs 96 removed therefrom and the corresponding end portion 98 fixedly secured to center portion 100 via a shaft 132. The single stack of discs 96a carried by piston 38a defines a variable area restriction generally indicated by 134 in flow controlling relationship with an inlet port 136 and an outlet port 138 in casing 124.

The end portion 98a of piston 38a slidably registers with fuel inlet 126 to vary the effective flow area of the latter and establish a corresponding metered flow of fuel to the engine 112 as a function of the position of piston 38a. Metered fuel passes from inlet 126 to outlet 127 via an annulus 140 partially defined by shaft 132. The rate of change or velocity of piston 38a depends upon the differential error between fuel pressures $P_a$ and $P_b$ derived from output passages 56a and 58a of proportionally acting pure fluid amplifier 46a and transmitted to chamber 128 at opposite ends of piston 38a via passages 42a and 44a, respectively. The inlet 48a of amplifier 46a is connected to a suitable source of pressurized fuel such as supply conduit 116 at fuel pump discharge pressure $P_s$ via a conduit 142. The control port 62a of amplifier 46a is connected via passage 64a to outlet port 138 from which a pressurized fuel signal $P_f$ is obtained. Fuel at pump discharge pressure $P_s$ is supplied to inlet port 136 from conduit 116 via a passage 144. The effective flow area of restriction 134 varies as a function of the position of piston 38a thereby controlling fuel pressure $P_f$ accordingly.

The fuel pressure differential $P_s - P_m$ across fuel metering device 124 may be regulated to a constant value by conventional fuel by-pass mechanism generally indicated by 146 and disposed in flow controlling relationship with a fuel by-pass conduit 148 connecting conduit 116 at pump discharge pressure $P_s$ with conduit 116 at pump inlet pressure $P_o$. The quantity of by-pass flow withdrawn through conduit 148 results in control over fuel pressure $P_s$ upstream from inlet 126. To that end, a variable area fuel by-pass valve 150 slidably carried in a casing 152 is in series with by-pass conduit 148 and actuated by a diaphragm 154 vented on one side to fuel pressure $P_s$ via a passage 156 and on the opposite side to fuel pressure $P_m$ via a passage 158. The pressure $P_m$ is aided by a compression spring 160 interposed between casing 152 and diaphragm 154 which spring determines the pressure $P_s$ in excess of pressure $P_m$ required to balance by-pass valve 150 regardless of variations in pressure $P_m$ as will be recognized by those persons skilled in the art.

An engine velocity sensor of the fluid vortex type is generally indicated by 162 and is fully described and shown in detail in copending application ser. No. 670,192 filed Sept. 25, 1967, in the name of George R. Howland (common assignee) and entitled Fluidic Velocity Sensor. In short, the velocity sensor 162 is provided with an inlet 164 connected via a passage 166 to passage 142 at fuel pressure $P_s$ and an outlet 168 connected via passage 64a to control port 60a of amplifier 46a. A circular chamber 170 carried by a rotatable shaft 172 suitably mounted in bearings 174 is adapted to receive fuel at pressure $P_s$ from inlet 164 and impart a tangential velocity to the same which flow follows a vortex path as it flows radially inwardly through chamber 170 to an outlet passage 176 centrally located with respect to chamber 170 and extending therefrom through shaft 172 into communication with outlet 168. The flow through chamber 170 being impeded by the vortex flow generated therein causes a corresponding drop in pressure from $P_s$ at inlet 164 to pressure $P_n$ at outlet 168 which pressure drop varies as a function of the rotational velocity of engine output shaft 114 which is suitably connected via linkage means 178 to shaft 172. Reference is made to the above-mentioned application Ser. No. 670,192 for additional details of structure and operation of the velocity sensor 162 if desired.

A piston 38b slidably carried in chamber 40b is adapted to independently control the effective flow areas of a passage 180 connected to vent passage 66a to conduit 116 at pump inlet pressure $P_o$ and a passage 182 leading from passage 166 at pressure $P_s$ to conduit 116 at pump inlet pressure $P_o$. The chamber 40b is provided with adjustable stops 184 and 186 which are engaged by piston 38b to limit the axial movement thereof.

An adjustable flow restriction 188 including a movable valve 189 in passage 182 upstream from piston 38b is connected via a link 190 to a movable control lever 192 operative between minimum and maximum engine reference speed positions.

The velocity of piston 38b is dependent upon the differential between pressures $P_c$ and $P_d$ applied thereto and transmitted to opposite ends of chamber 40b via passages 42b and 44b leading from output passages 56b and 58b, respectively, of pure fluid amplifier 46b. The pressure differential between pressures $P_c$ and $P_d$ varies in proportion to the input pressure differential between pressures $P_n$ and $P_t$ transmitted to control ports 62b and 60b, respectively, via passages 66b and 64b leading from passage 64a and passage 182 intermediate restriction 188 and piston 38b.

Figure 7:
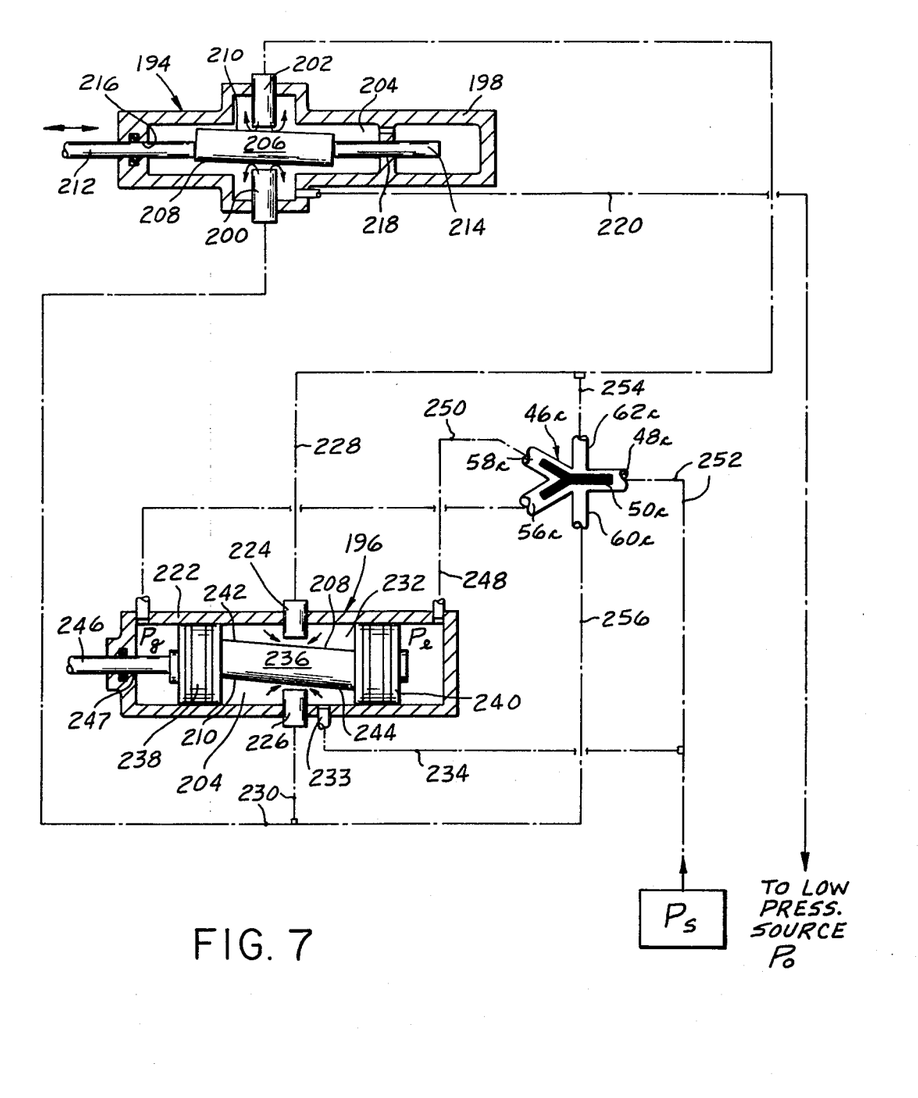
FIG. 7 is a schematic representation of a remote position indicating device embodying the fluidic bridge circuitry of the present invention.

Referring to FIG. 7, a remote position indicator is defined by master and slave units 194 and 196, respectively. The master unit 194 includes a casing 198 having inlet ports 200 and 202 and a chamber 204 therein. An axially movable valve 206 provided with contoured portions 208 and 210 which coact with inlet ports 200 and 202, respectively, in a push-pull relationship to vary the effective flow areas thereof in accordance with the axial position of valve 206. The valve 206 has integral end rod portions 212 and 214 which are slidably carried in suitable openings 216 and 218, respectively, in casing 198. The rod portion 212 may extend through casing 198 into engagement with any desired variable position input member, not shown, such as a control lever, not shown, similar to lever 192 such that the position of valve member 206 and thus flow areas of inlet ports 200 and 202 vary simultaneously as a function of the position of the input member. The chamber 204 is vented via a passage 220 to a relatively low pressure fluid source such as the fuel inlet to pump 120 at pressure $P_o$.

The slave unit 196 includes a casing 222 having outlet ports 224 and 226 connected via passages 228 and 230, respectively, to inlet ports 202 and 200. A supply chamber 232 in casing 222 is vented via a port 233 and a passage 234 to a source of relatively high pressure fluid source such as the fuel discharged at pressure $P_s$ from pump 120. An axially movable valve 236 having end pistons 238 and 240 slidably carried in chamber 232 is further provided with contoured portions 242 and 244 which coact with outlet ports 224 and 226, respectively, in a push-pull relationship to vary the effective flow areas thereof in accordance with the axial position of valve 236. A rod portion 246 secured to piston 238 extends therefrom through a suitable opening 247 in casing 222 to provide an output position signal representative of the position of valve 236. The pistons 238 and 240 are responsive to pressures $P_c$ and $P_g$, respectively, derived from output passages 56c and 58c of pure fluid amplifier 46c and transmitted therefrom to opposite ends of chamber 232 via passages 248 and 250. The inlet 48c of amplifier 46c is connected via a passage 252 to passage 234. The control ports 60c and 62c of amplifier 46c are connected to passages 228 and 230, respectively, via passages 254 and 256. It will be recognized that the piston 38 and associated discs 96 may be substituted for the valves 206 and 236, if desired.

In operation, the valve 206 is positioned in accordance with the position of the input member, not shown, connected thereto. It will be assumed that the valve 206 is actuated to the left from the position shown in FIG. 7 causing a simultaneous increase and decrease in areas of inlet ports 202 and 200, respectively, thereby varying the area ratio thereof accordingly. The area change of ports 202 and 200 which are downstream and in series flow relationship with ports 224 and 226, respectively, of slave unit 196 causes a decrease in pressure in passage 228 and a corresponding increase in pressure in passage 230 which generates a corresponding pressure differential between control ports 60c and 62c causing power jet stream 50c to deflect toward control port 62c thereby producing a corresponding proportionally amplified output pressure differential $P_e - P_g$ at output passages 56c and 58c which, in turn, drives valve 236 to the left as viewed in FIG. 7. Valve 236 moves causing a simultaneous increase and decrease in area of inlet ports 224 and 226, respectively, thereby producing a decrease in pressure in passage 230 and an increase in pressure in passage 228 and a corresponding decrease in the pressure differential applied through control ports 60c and 62c against the power jet stream 50c. Upon valve 236 moving to a position where the area ratio of inlet ports 224 and 226 is equivalent to the area ratio of inlet ports 202 and 200, the pressures in passages 228 and 230 equalize causing the pressure differential across control ports 60c and 62c and thus pressure differential $P_e - P_g$ at output passages 56c and 58c to decrease to zero whereupon the valve 236 is stabilized.

Movement of valve 206 in the opposite direction from that described above results in a reversal of the above-described sequence of operation.

It will be noted that the master unit 194 may be operated in a relatively high temperature environment by virtue of the cooling thereof provided by the continuous flow of fuel through chamber 204. Likewise, a continuous flow of fuel is maintained through chamber 232 of slave unit 196. Furthermore, it will be noted that fuel temperature variations at the master unit 194 will occur on both sides of the fluid bridge circuit defined, in part, by series flow inlet ports 226, 200 and 224, 202 such any thermal effect on fuel density will not result in position error of the valve 236.

Figure 8:
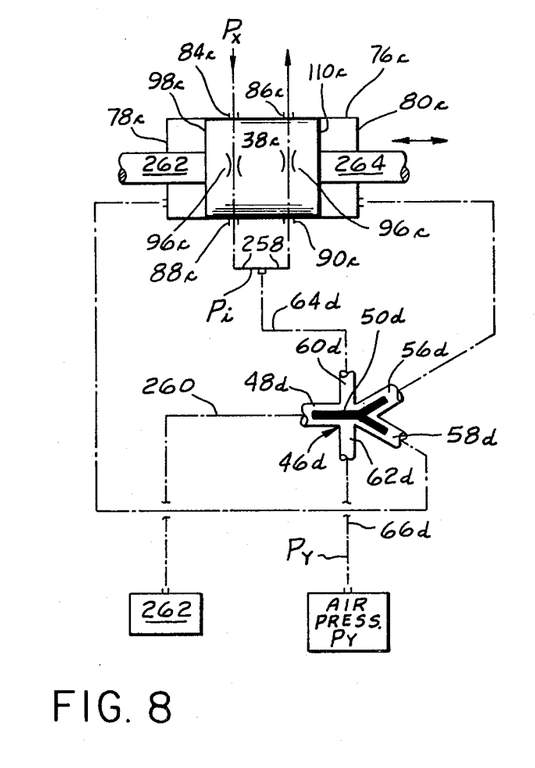
FIG. 8 is a schematic representation of a fluid pressure ratio sensing device embodying the present inventive concept.

FIG. 8 illustrates a device for sensing the ratio of two variable air pressures $P_x$ and $P_y$ and providing a position output signal as a function of the ratio of said pressures. A piston 38c slidably carried in casing 76c has its end portions 98c and 110c vented to the output passages 58d and 56d, respectively, of a pure fluid amplifier 46d. The inlet port 84c is connected to a source of air at variable pressure $P_x$ and the corresponding outlet port 88c is connected via a passage 258 to outlet port 90c. The inlet port 86c may be vented to a relatively low pressure air source such as the atmosphere.

The inlet 48d of amplifier 46d is connected via a passage 260 to a source of air 262 at a substantially constant pressure. The control port 60d is vented via passage 64d to passage 258 at pressure $P_i$ intermediate outlet ports 88c and 90c. The control port 62d is vented to a source of air at variable pressure $P_y$ via passage 66d.

The piston 38c provides two variable area restrictions in series flow relationship which by virtue of the well-known equations of flow through series restrictions generates intermediate pressure $P_i$ which varies as a predetermined function of the air pressure $P_x$ upstream therefrom when the downstream variable area restriction associated with port 86c is maintained in a choked condition. Reference is made to Pat. No. 3,002,348 issued Oct. 3, 1961, in the name of E. A. Haase (common assignee) for a detailed description of two flow restrictions in series and the manner in which the pressure intermediate the same may be made to vary in the above-mentioned manner as a function of the ratio of the areas of the two series flow restrictions which correspond to the series restrictions in piston 38c.

In operation, the pressure ratio sensing device of FIG. 8 functions to provide an output position signal by virtue of end rod portions 262 and 264 secured to pistons 98c and 110c, respectively, and slidably extending through respective end caps 78c and 80c which output position varies as a predetermined function of the ratio of pressures $P_x$ and $P_y$. Assuming the areas of the upstream restriction associated with port 84c and the downstream restriction associated with port 86c to have a predetermined area ratio with the downstream restriction choked, the intermediate pressure $P_i$ is a predetermined fraction of upstream pressure $P_x$ and is transmitted to control port 60d of amplifier 46d. The magnitude of pressure $P_i$ relative to pressure $P_x$ is a function of the area ratio of the two restrictions in series flow in piston 38c. Air at pressure $P_y$ is transmitted to control port 62d of amplifier 46d where, assuming the pressures $P_i$ and $P_y$ are equal, the power jet stream 50d of amplifier 46d is equally divided between output passages 56d and 58d. The resulting equal air pressures transmitted to end portions 98c and 110c of piston 38c which is held stationary accordingly with rod portions 262 and 264 providing a corresponding output position signal.

Assuming air pressure $P_x$ increases, the intermediate pressure $P_i$ will increase accordingly in proportion to pressure $P_x$. The resulting pressure differential $P_i - P_y$ generated across the power jet stream 50d of amplifier 46d deflects the power jet stream 50d toward control port 62d thereby splitting flow unequally between output passages 56d and 58d in proportion to the control pressure differential $P_i - P_y$ which, in turn, generates a corresponding pressure differential between output passages 56d and 58d to which the piston 38c responds by moving to the right as viewed in FIG. 8. The piston 38c carries discs 96c which coact with the respective arcuate slots 92c of ports 84c and 86c to vary the flow area ratio thereof and increase the intermediate pressure $P_i$ accordingly whereupon the pressure differential $P_i - P_y$ applied across the power jet stream 50d is reduced to zero and the output passages 56d and 58d equally pressurized causing piston 38c to stabilize.

A decrease in pressure $P_x$ and resulting corresponding decrease in intermediate pressure $P_i$ results in a pressure differential $P_y - P_i$ across power jet stream 50d and deflection thereof toward control port 60d to direct more of the power jet stream 50d into output passage 56d and less into the output passage 58d with the resulting pressure differential driving piston 38c to the left as viewed in FIG. 8. As in the case of the above-mentioned increase in pressure $P_x$, the movement of piston 38c results in a variation of the flow area ratio of ports 84c and 86c by virtue of the discs 96c coacting with the respective arcuate slots 92c so as to increase the intermediate pressure $P_i$ and reduce the pressure differentials $P_y - P_i$ across power jet stream 50d to zero thereby stabilizing piston 38c.

In the event of a variation in pressure $P_y$ instead of pressure $P_x$, it will be recognized that the pressure differential $P_i - P_y$ will vary in a reverse manner relative to the above-described increase or decrease in pressure $P_x$ with a corresponding reversed movement of piston 38c. However, it will be understood that the intermediate pressure $P_i$ which varies as a function of the area ratio of the two series flow restrictions in piston 38c is controlled as required to equal pressure $P_y$ regardless of variations in pressure $P_x$ and/or $P_y$ with the resulting position of piston 38c being a function of the ratio of pressures $P_x$ and $P_y$.

Referring to FIG. 6, the fuel control system shown therein operates in the following manner. It will be assumed that the engine 112 is initially operating at a stable engine idle speed corresponding to the set position of control lever 192 in which case the various component devices of the system occupy the positions shown.

Asuming that the control lever 192 is actuated to a position requesting an acceleration to a maximum engine speed, the flow area of restriction 188 is reduced accordingly causing a reduction in pressure $P_t$ which passes to amplifier 46b thereby generating a $P_n - P_t$ pressure differential across power jet stream 50b which is deflected toward control port 60b resulting in a corresponding proportional pressure differential $P_e - P_d$ at output passages 56d and 58b which is applied against piston 38b driving the same against stop 184 to fix the position of piston 38b. The effective flow area of inlet port 86b is reduced to a fixed value by virtue of the associated variable area discs 96b carried by piston 38b resulting in an increase in pressure $P_f$ at control port 62a of amplifier 46a thereby generating a $P_n-P_f$ pressure differential across power jet stream 50a which is deflected toward control port 60a resulting in a corresponding proportional amplified pressure differential $P_b-P_a$ at output passages 56a and 58a. The pressure differential is applied against piston 38a driving the same which results in end portion 98a thereof sliding relative to fuel inlet port 126 to increase the flow area thereof which, in turn, in conjunction with the constant pressure differential maintained thereacross by by-pass valve 146 establishes a predetermined increase in fuel flow to initiate engine acceleration. Motion of piston 38a will cease when $P_f$ is equal to $P_n$.

As the engine accelerates, the pressure $P_n$ driven from speed sensor 162 decreases as a function of engine speed increase. The piston 38a carrying discs 96a causes a decrease in flow area restriction 134 and a corresponding drop in pressure $P_f$ to maintain a balance between pressures $P_n$ and $P_f$. If $P_n$ decreases at a faster rate than $P_f$, the piston 38a will be unbalanced in a fuel flow increasing direction whereas, in the event of $P_f$ decreasing faster than $P_n$, the piston movement will be reversed to establish a corresponding decrease in fuel flow to the engine. The resulting acceleration fuel flow is therefore a function of pressure $P_n$ which varies with engine speed. The acceleration fuel flow may be made linear or non-linear as desired depending upon the relationship between the area of slots 102 and discs 96 and stroke of piston 38a.

Upon approaching the requested engine speed, the decreasing pressure $P_n$ approaches pressure $P_t$ with the resulting decrease in pressure differential $P_n-P_t$ across amplifier 46b and thus output pressure differential $P_c-P_d$ therefrom acting against piston 38b to urge the same off stop 184. As the piston 38b moves off stop 184 the area of inlet 84b is increased to modify pressure $P_t$ which balances pressure $P_n$ to eliminate the pressure differential across piston 38b and stabilize the same. Movement of piston 38b off stop 184 also causes a simultaneous increase in flow area of inlet port 86b which, in turn, reduces pressure $P_f$ in response to which resulting pressure differential $P_n-P_f$ the power jet stream 50a of amplifier 46a is deflected toward port 62a thereby generating a corresponding amplified pressure differential $P_b-P_a$ which drives piston 38a in a direction to reduce the flow area of port 126 and reduce fuel flow to stabilize the engine at the requested speed.

It will be understood that movement of control lever 192 to a position requesting an engine deceleration to a lower than existing engine speed results in a sequence which is the reverse of that described above for an engine acceleration to schedule an engine deceleration fuel flow which is proportionally less than the acceleration fuel flow. To that end, movement of control lever 192 to a lower than existing speed request position causes an increase in area of restriction 188 which results in an increase in pressure $P_t$. The resulting differential $P_t-P_n$ applied to amplifier 46b and amplified acts against piston 38b urging the same against stop 186 which, in turn, establishes an increase in area of port 84b and an increase in area of port 86b. The subsequent reduction in pressure $P_f$ deflects the jet stream 50a of amplifier 46a to the right with the resulting amplified output pressure differential $P_a-P_b$ urging piston 39a in a direction to reduce the area of inlet port 126 and thus fuel flow to the engine. Motion of piston 38a increases the area of restriction 136 and thereby increases intermediate pressure $P_f$. As the engine decelerates, the pressure $P_n$ increases with decreasing engine speed thereby requiring an increase in pressure $P_f$ which, in response to movement of piston 38a and the corresponding increase in area of restriction 134, increases progressively to effect a decreasing fuel flow schedule. Upon approaching the requested lower engine speed, pressures $P_t$ and $P_n$ tend to null amplifier 46b which, in turn, causes piston 38b to move off stop 186 to effect a decrease in area of inlet port 84b and a reduction in area of inlet port 86b thereby balancing pressures $P_t$ and $P_n$ as well as pressures $P_f$ and $P_n$ whereupon the piston 38a and thus fuel flow to the engine stabilize to control the engine at the requested speed.

It will be understood that the above described movement of piston 38b against stops 184 and 186 occurs as a result of a speed change request by control lever 192 of relatively large magnitude. A relatively small speed change request causes a corresponding small variation in area of restriction 188 and thus pressure $P_t$ which, in turn, results in a relatively small pressure deviation between $P_t$ and $P_n$ across amplifier 46b whereupon the corresponding amplified pressure differential applied to piston 38b results in movement of piston to an intermediate position between stops 184 and 186.

Various changes and modifications in the above described structure may be made by those persons skilled in the art without departing from the scope of the present invention as defined by the following claims.

I claim:

1. Fuel control apparatus for a combustion engine comprising:
   an engine power control lever;
   a fuel conduit connected to supply fuel from a source of pressurized fuel to said combustion engine;
   fuel flow control means operatively connected to said fuel conduit for controlling the rate of fuel flow therethrough to said engine;
   control means operatively connected to said fuel flow control means for controlling the same including:
   (a) parallel first and second flow passages connected to transmit fluid from a pressurized source to a relatively lower pressure source;
   (b) first and second variable area flow restriction means connected in series flow relationship in said first flow passage;
   (c) third and fourth variable area flow restriction means connected in series flow relationship in said second flow passage;
   (d) fluid pressure generating means operatively connected to said engine for generating a fluid pressure which varies as a function of an engine operating condition related to engine power output;
   (e) first fluid pressure responsive means responsive to a first fluid pressure intermediate said first and second flow restriction means and said fluid pressure generated as a function of an engine operating condition and operatively connected to said fuel flow control means and said first restriction means for varying the effective flow area thereof in response to a differential between said first intermediate pressure and said generated pressure,
   second fluid pressure responsive means responsive to a second fluid pressure intermediate said third and fourth restriction means and said fluid pressure generated as a function of an engine operating condition and operatively connected to said second and fourth restriction means for varying the effective flow area thereof in response to a differential between said second intermediate pressure and said generated pressure,
   said power control lever being operatively connected to said third restriction means for varying the effective flow area thereof as a function of the position of said control lever.

2. Fuel control apparatus as claimed in claim 1 wherein: said variable condition of engine operation related to power output is engine rotational speed.

3. Fuel control apparatus as claimed in claim 1 wherein:

said first fluid pressure responsive means includes first pressure differential responsive piston means and first pure fluid amplifier means responsive to said first intermediate pressure and said generated fluid pressure for producing a proportionally amplified pressure differential to which said first piston means responds;

said second fluid pressure responsive means includes a second pressure differential responsive means and second pure fluid amplifier means responsive to said second intermediate pressure and said generated fluid pressure for producing a proportionally amplified pressure differential to which said second piston means respond; said first and second pure fluid amplifier means each having a pair of spaced apart output fluid passages, opposed first and second control fluid ports pressurized by said generated fluid pressure and associated intermediate pressure, respectively, and a power fluid jet responsive to said pressurized first and second control ports and deflected thereby to unequally pressurize said pair of output fluid passages and establish said amplified pressure differential therebetween in proportion to the degree of deflection of said power fluid jet.

4. Fuel control apparatus as claimed in claim 3 and further including: stop means adapted to be engaged by said second piston means for limiting the extent of axial movement thereof.

5. Fuel control apparatus as claimed in claim 1 wherein:

said fuel flow control means includes a variable area fuel metering orifice and a fuel by-pass valve means operatively connected to said fuel conduit upstream from said metering orifice;

said fuel by-pass valve means being operative to maintain a predetermined constant fuel pressure differential across said fuel metering orifice.

6. Fuel control apparatus as claimed in claim 2 wherein:

said fluid pressure generating means includes a fluid conduit connected to transmit fluid from a pressurized source to a relatively lower pressure source; and rotatable means actuated in response to engine rotational speed operatively connected to said fluid conduit for generating a fluid vortex to impede fluid flow therethrough thereby establishing said fluid pressure which varies as a function of engine rotational speed.

References Cited
UNITED STATES PATENTS

| | | | |
|---|---|---|---|
| 3,527,051 | 4/1968 | Stearns et al. | 60—39.28 R |
| 3,302,398 | 2/1967 | Taplin et al. | 60—39.28 R |
| 3,248,043 | 4/1966 | Taplin et al. | 60—39.28 R |
| 3,342,196 | 9/1967 | Przybylko | 60—39.28 R |
| 3,306,037 | 2/1967 | Fortmann et al. | 60—39.28 R |

CARLTON R. CROYLE, Primary Examiner

R. E. GARRETT, Assistant Examiner